Jan. 20, 1953     E. L. HARDER ET AL     2,626,376
MOTOR CONTROL SYSTEM
Filed June 29, 1950
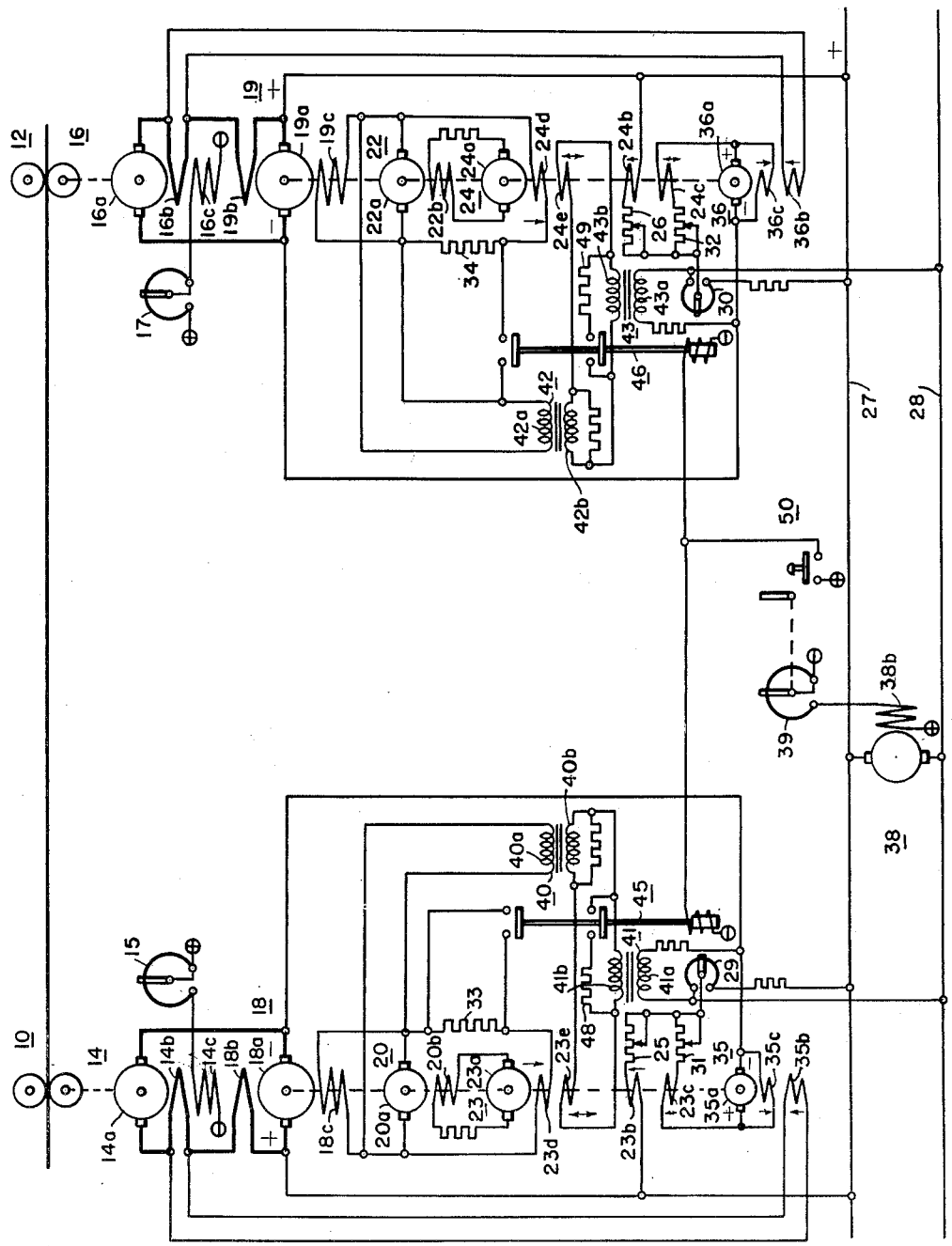
WITNESSES:
INVENTORS
Edwin L. Harder, Robert I. Greenwood
Raymond W. Moore & Loren F. Stringer
BY
ATTORNEY Patented Jan. 20, 1953

2,626,376

UNITED STATES PATENT OFFICE 2,626,376

MOTOR CONTROL SYSTEM

Edwin L. Harder, Pittsburgh, Pa., Robert I. Greenwood, Montrose, Calif., and Raymond W. Moore and Loren F. Stringer, Pittsburgh, Pa., assignors to Westinghouse Electric Corporation, East Pittsburgh, Pa., a corporation of Pennsylvania Application June 29, 1950, Serial No. 171,139

10 Claims. (Cl. 318—143)

Our invention relates, generally, to motor control systems, and has reference, in particular, to voltage regulating control systems such as are used to control the several roll stand motors of a tandem strip mill, or the like.

Generally stated, it is an object of our invention to provide a control system for a plurality of motors, which is simple and inexpensive to manufacture, and is reliable and effective in operation.

More specifically, it is an object of our invention to provide, in a control system for a plurality of roll stand or mill motors in a tandem mill, for regulating the speeds of the several mill motors relative to each other by matching their counter E. M. F.'s plus their IR drops with a common reference voltage.

Another object of our invention is to provide, in a motor control system, for supplying the basic excitation for a generator supplying electrical energy to the motor, from a source of variable reference voltage, and effecting regulation of the motor by utilizing a differential between the reference voltage and the voltage applied to the motor for controlling the operation of the motor.

Yet another object of our invention is to provide, in a regulating system for a motor, for using an IR drop exciter connected in circuit relation with the control field winding of a regulating generator, the exciter having a cumulative field winding energized in accordance with the armature current of the motor and a differential field winding energized in accordance with the output voltage of the exciter.

It is also an object of our invention to provide, in a control system for a motor, for utilizing transient differential field excitation for a regulating generator controlling the operation of the motor, which is proportional to both the rate of change of voltage applied to the motor, and the rate of change of a differential between a reference voltage and the voltage applied to the motor.

Still another object of our invention is to provide, in a control system for a plurality of roll stand motors in a tandem mill, for normally utilizing a relatively stiff or high gain regulating system for maintaining a predetermined speed relation between the motors, and for reducing the stiffness of the regulating system by decreasing the gain thereof when making an emergency stop of the mill.

Another important object of our invention is to provide, in a control system for a tandem mill, for simultaneously increasing the degenerative effect of an anti-hunt field winding on a regulating generator controlling the operation of one of the mill motors, and reducing the effectiveness of damping applied to the regulating generator.

It is an important object of our invention to provide, in a tandem strip mill, for making the gain of the control system of successive stand motors progressively greater so as to increase the rate of response at successive stands and tend to make the voltage of the generator of each succeeding roll stand motor lead that of the preceding stand during changes in operating conditions of the mill.

Other objects and advantages will become more apparent from the disclosure given hereinafter.

In practicing our invention according to one of its embodiments, each of the roll stand or mill motors of a tandem mill is energized from a separate generator whose output voltage is controlled by a separate exciter having a regulating generator individual thereto. Each of the regulating generators receives its basic excitation from a common variable voltage reference source, while regulation is effected by energizing a control field winding of the regulating generator in accordance with a differential which may exist between the variable reference voltage and the voltage applied to the particular roll stand motor. An IR drop exciter is connected in series circuit relation with the control field winding. Damping is effected by connecting damping transformers both across the exciter and in series circuit relation with the reference source and the armature of the main generator of each mill motor, to apply their outputs to a damping winding on the regulating generator. An anti-hunt field winding on the regulating generator is connected across the exciter to stabilize the system and reduce the effective time constants of the regulating generator and the exciter.

For a more complete understanding of the nature and scope of our invention, reference may be made to the following detailed description, which may be read in connection with the accompanying drawing, in which the single figure is a diagrammatic view of a control system embodying the invention as applied to a tandem strip mill.

Referring to the drawing, the reference numerals 10 and 12 denote generally two successive stands of a tandem strip mill, which may comprise two or more such stands.

The roll stands 10 and 12 are provided with mill motors 14 and 16, having armatures 14a, 16a, series field windings 14b, 16b, and separately excited shunt type main field windings 14c and 16c, respectively. The field windings 14c and 16c are connected to a suitable source of electrical energy through field rheostats 15 and 17, respectively, for varying the speeds of their respective motors.

Electrical energy is supplied to the armatures 14a and 16a from separate main generators 18 and 19 individual to the motors 14 and 16, respectively. The main generators 18 and 19 may be of any suitable type having for example, armatures 18a and 19a, series field windings 18b and 19b, and separately excited main field windings 18c and 19c, respectively. Main exciters 20 and 22 are provided for supplying field excitation to the main field windings 18c and 19c, having armatures 20a and 22a, and field windings 20b and 22b, respectively.

Control of the output voltages of the main generators 18 and 19 is obtained by utilizing regulating generators 23 and 24 for controlling the energization of the exciter field windings 20b and 22b, respectively. The regulating generators 23 and 24 have armatures 23a and 24a connected in circuit relation with the field windings 20b and 22b of the exciters.

The basic excitation for the regulating generators is provided by means of basic excitation field windings 23b and 24b, which are connected through control resistors 25 and 26 to a source of adjustable reference voltage by means of conductors 27 and 28 and potentiometers 29 and 30, for thus determining the basic excitation of the exciters, which in turn supply the air gap excitations of the main generators to bring their voltages substantially up to the desired values as determined by the value of the reference voltage. The regulating generators may also be provided with control field windings 23c and 24c, anti-hunt field windings 23d, 24d and damper field windings 23e and 24e. The basic excitation for the regulating generator 24 may be increased by adjusting the resistor 26 so that in the steady state condition the voltage of the main generator 19 may be slightly higher than the reference voltage with the control field winding open circuited.

Regulation of the speeds of the mill motors 14 and 16 is obtained by connecting the control field windings 23c and 24c of the regulating generators both to the reference bus conductors 27 and 28, through potentiometers 29, 30 and resistors 31, 32; and to the armatures 18a and 19a of the main generators 18 and 19 of the respective mill motors, so as to be energized therefrom in accordance with a differential between the voltages of the main generator armatures and the reference bus. The control field windings are connected to substantially correct the voltage of the respective main generator for any error existing between it and the reference voltage. The resistors 31 and 32 are utilized to vary the gain of the systems, being increased in value to reduce the gain.

The anti-hunt field windings 23d and 24d of the regulating generators are connected across the armatures of the respective exciters 20 and 22 through control resistors 33 and 34, respectively, with a polarity such as to oppose the action of their respective control windings, and hence reduce the effective time constants of the regulating generators and exciters, as well as to decrease the effect of the residual magnetic flux thereof, thus making the regulating systems more stable and more accurate. Any loss of gain resulting from the use of such a field winding can be readily compensated for by increasing the voltage gain of the other elements.

The equation relating the input voltage $E_1$ of the control field and the output voltage $E_0$ of the exciter is:

$$\frac{E_0}{E_1} = \frac{A_r A_x}{D\left(\frac{T_r T_x}{D}p^2 + \frac{T_r + T_x}{D}p + 1\right)}$$

where $A_r$ is the voltage gain of the regulating generator attributable to the control field winding 23c $A_x$ is the voltage gain of the exciter 20

$T_r$ is the time constant of the regulating generator 23

$T_x$ is the time constant of the exciter 20

$D$ equals $1 + A_a A_x$ where $A_a$ is the gain of the regulating generator attributable to the anti-hunt field winding 23d. The voltage gain of the control system for one roll stand may be represented by the equation:

$$A = \frac{A_r A_x A_g}{1 + A_a A_x}$$

where $A_g$ is the voltage gain of the main generator. $A$ is the gain of the system $A_r$ is the voltage gain of the regulating generator attributable to the control field winding $A_x$ is the voltage gain of the exciter $A_a$ is the voltage gain of the regulating generator attributable to the anti-hunt field winding.

In the present instance, a gain $A$ of better than 50 was used, giving a system having a fast response and which is well damped, having a steady-state accuracy on the order of .5% of the rated generator voltage. In practice, we have found it desirable to make the gain of the system for each succeeding stand in a tandem mill somewhat greater than that of the preceding stand, so as to obtain a more stable operating system. The gain of the stand's systems in a five stand tandem mill might, for example, be on the order of 50, 52, 54, 56 and 60, so that the voltage of each stand would tend to lead that of the preceding stand during transient conditions.

In order to compensate for IR drop, IR drop exciters 35 and 36 are utilized having main field windings 35b and 36b connected across the series field windings 14b and 16b of the mill motors 14 and 16, respectively. Differential field windings 35c and 36c are connected across the armatures 35a and 36a of the IR drop exciters. These exciters are connected in series circuit relation with the control field windings 23c and 24c, so as to introduce voltages which add to the reference voltages in such manner that the system regulates for a higher value of full load voltage than no load voltage, thus compensating for the effects of IR drop.

The reference bus conductors 27 and 28 are energized from any suitable source of variable voltage, being, for example, connected to a reference generator 38 having a field winding 38b connected to a source of electrical energy through a field rheostat 39. The field rheostat 39 may be operated in any well known manner to vary the voltage of the reference generator 38, and thus determine the speed of the mill.

In order to provide damping of the regulating generators 23 and 24 to compensate for transient conditions, these generators are provided with damping transformers 40 and 41, and 42 and 43, respectively. The damping transformers 40 and 42 have primary windings 40a and 42a connected across the armatures 20a and 22a of their respective exciters. Secondary windings 40b and 42b are connected in series circuit relation with the damper windings 23e and 24e, respectively, to introduce therein voltages proportional to the rates of change of their respective primary, and hence exciter voltages. The damping transformers 41 and 43 have primary windings 41a and 43a connected across the reference bus conductors 27 and 28 and the armatures 18a and 19a, respectively, in opposed relations, so as to be energized in accordance with changes in the differentials between the armature voltages of the main generators and the voltage of the reference bus. The secondary windings 41b and 43b are connected to the damper windings 23e and 24e in series circuit relation with the secondary windings of the damping transformers 40 and 42, respectively.

Since it has been found desirable to reduce the stiffness or gain of the control system for each of the mill motors in a tandem mill when making an emergency stop, control means such as the control relays 45 and 46 are provided for shunting the control resistors 33 and 34, so as to increase the energization of the differential field windings 23d and 24d, respectively. The control relays are also utilized to provide shunt circuits across the secondary windings 41b and 43b of the damping transformers 41 and 43 through control resistors 48 and 49, respectively, thus reducing the effectiveness of the damping transformers. Operation of the control relays 45 and 46 is effected in any suitable manner, such as by means of a limit switch 50, which may be actuated when the field rheostat 39 of the reference voltage generator 38 is operated to its minimum voltage position to bring the mill to a stop.

In the operation of the mill, the basic excitation for the regulating generators 23 and 24 will be provided by means of the basic excitation field windings 23b and 24b, which are energized directly from the reference bus conductors to provide substantially all the M. M. F. necessary to raise the output voltages of the main generators to the values corresponding, generally, to the value of the reference voltage. Actually the basic excitation for the regulating generator is adjusted to supply the air gap excitation of the main generator since this adjustment results in a minimum steady state error Regulation of the output voltages of the regulating generators to maintain accurately the desired values of main generator voltage, is obtained by the regulating effect of the control field windings 23c and 24c, the energization of which is directly proportional to any differential between the voltages of the main generators 18 and 19, and the portions of the voltages applied to the control field windings from the reference bus conductors. When these two values are balanced, the control field windings remain in a deenergized condition, if the effects of the IR drop exciters are neglected. Depending on the loads, the IR drop exciters will increase the value of generator voltage for which the system regulates.

Should the voltage of one of the generators exceed that of the reference bus, a current flows through the control field winding of its regulating generator in a direction such as to reduce the output voltage regulating generator and hence reduce the output voltage of the main generator to restore the balanced condition.

Any change in the voltage of the exciters 20 and 22 will be reflected by means of the damping transformers 40 and 42 into the excitation system of the regulating generators to produce a transient correction for the change. Likewise, the damping transformers 41 and 43 introduce corrective voltages into the excitation circuits of the regulating generators proportional to the rates of change of the differentials between the output voltages of their respective main generators and the voltage of the reference bus conductors.

When the mill is stopped the rheostat 39 will be actuated in a clockwise direction to the minimum voltage position, thus operating the limit switch 50. Control relays 45 and 46 will thereupon be energized so as to shunt the control resistors 33 and 34 to increase the energization of the differential field windings 23d and 24d, thus reducing the gains of the regulating generators. At the same time, resistors 48 and 49 will be connected across the secondary windings of the damping transformers 40a and 43a so as to effectively reduce their damping effect.

Since certain changes may be made in the above-described construction, and different embodiments of the invention may be made without departing from the spirit and scope thereof, it is intended that all the matter contained in the above description and shown in the accompanying drawing, shall be considered as illustrative and not in a limiting sense.

We claim as our invention:

1. In a control system for a roll stand motor in a tandem mill, a main generator individual to the motor, regulating means connected to control the output of said main generator including a regulating generator having a plurality of field windings, circuit means connecting one of said field windings to a source of adjustable reference voltage, circuit means connecting another of said field windings to the reference voltage source and to the main generator in opposed relation, an auxiliary exciter responsive to the current of the roll stand motor connected in circuit relation with said another field winding, and additional circuit means connecting yet another of said field windings to be energized in accordance with the rate of change of the voltage of the main generator and the rate of change of the differential between the reference voltage and the voltage of the main generator.

2. In a control system for a motor, a main generator individual to the motor, a regulating generator having a plurality of field windings connected to control the output voltage of the main generator, circuit means connecting one of said field windings to a source of adjustable reference voltage, additional circuit means connecting another of said field windings to said source of reference voltage and said main generator in opposed relation, other circuit means connecting yet another of said windings to damping transformers producing voltages proportional respectively to the rate of change of the differential between the reference voltage and the voltage of the main generator and the rate of change of a voltage used to control the main generator, circuit means including an impedance device connecting still another of said field windings to be energized in accordance with said voltage used to control the main generator, control means operable to reduce the variable reference voltage, and switch means operable in response to operation of the control means to render the impedance device and the voltage proportional to the rate of change of the voltage used to control the main generator substantially ineffective.

3. A control system for a motor comprising, a main generator having an armature connected to supply electrical energy to the motor and having a field winding, regulating means connected to effect energization of the generator field winding including a regulating generator having a plurality of field windings, circuit means connecting one of said windings to an adjustable voltage reference source, additional circuit means connecting another of said windings in circuit relation with a voltage from said source of reference voltage and from said main generator in opposed relation, and an exciter responsive to the armature current of the motor connected in circuit relation with said another field winding.

4. In a motor control system, generating means connected to supply electrical energy to the motor, regulating means connected to regulate the output voltage of the generator including a regulating generator having a plurality of field windings, circuit means connecting one of said field windings to an adjustable source of reference voltage, additional circuit means connecting another of said field windings to be energized in accordance with a differential between voltages of the reference voltage source and the generator, and circuit means connecting yet another of said windings to be energized in accordance with the rate of change of said differential.

5. The combination in a control system for a tandem mill having a plurality of roll stand motors for driving rolls handling a continuous strip of material, of a separate main generator for each roll stand motor, a regulating generator connected to control the output voltage of each of the main generators, each of said regulating generators having a plurality of field windings, circuit means connecting one of said windings of each regulating generator to a common source of adjustable reference voltage, circuit means connecting another of said windings of each of each of said regulating generators to be energized in accordance with the differentials between the common reference voltage and the voltage of its respective main generator, circuit means connecting another of said windings of each regulating generator to be energized in accordance with the rate of change of the differential between the reference voltage and the voltage of its associated main generator.

6. A control system for a roll stand motor in a tandem mill comprising, a main generator individual to the motor, an exciter connected to apply a control voltage to the main generator, a regulating generator having a plurality of field windings connected to apply a control voltage to the exciter, circuit means connecting one of said field windings to a source of adjustable reference voltage, additional circuit means including an auxiliary exciter responsive to the armature current of the roll stand motor connecting another of said field windings to the source of reference voltage and to the main generator in opposed senses, circuit means including a damping transformer connected across the exciter and another connected between the reference voltage source and the main generator connected to effect transient energization of yet another one of said field windings, and circuit means connecting still another of said field windings to be energized in accordance with the output voltage of the exciter.

7. In combination with a motor, a main generator connected to supply electrical energy to the motor armature, regulating means connected to regulate the output voltage of the main generator including a regulating generator connected to apply a control voltage to the main generator, said regulating generator having a plurality of field windings, circuit means connecting one of said field windings to a source of adjustable reference voltage, additional circuit means connecting another of said field windings to said reference voltage source and to the main generator in opposed relation, and an IR drop generator connected in circuit relation with said another field winding, said IR drop generator having a main field winding energized in accordance with the armature current of the motor, and a differential field winding energized in accordance with the output voltage of the booster generator.

8. The combination in a regulating system for a motor, of a main generator having a gain of 18 connected to supply electrical energy to the motor, an exciter having a gain of .884, and a regulating generator having a basic excitation field winding connected to a source of adjustable reference voltage, a control field winding attributing a gain to the regulating generator of 8.65 and connected to the source and the main generator in opposition, and a differential field winding opposing the control field winding capable of attributing a gain of 1.92 to the regulating generator connected to be energized from the exciter.

9. A control system for a plurality of motors comprising, a main generator individual to each motor connected to supply electrical energy to the motor, an exciter individual to each main generator connected to supply electrical energy to the generator, a regulating generator individual to each exciter connected to supply electrical energy to the exciter, said regulating generators each having a plurality of field windings, circuit means connecting one of said windings of each regulating generator to a source of adjustable reference voltage to supply the principal excitation, circuit means connecting another of the windings of each regulating generator to the reference source and the respective generator in opposed relation to provide a control field winding, circuit means including a resistor connecting yet another of said field windings of each regulating generator to the respective exciter to oppose the action of the control field winding, control means operable to reduce the reference voltage, and switch means operable in response to operation of the control means to shunt each of said resistors to reduce the gain of each system.

10. The combination in a tandem mill, of a plurality of motors connected in driving relation one with each of the roll stands of the mill, and a control system for each motor including a main generator, an exciter connected to supply field excitation for the main generator, and a regulating generator connected to supply field excitation to the exciter in accordance with a common reference voltage, the gain of the control system for each succeeding stand being greater than that of the preceding stand.

EDWIN L. HARDER.
ROBERT I. GREENWOOD.
RAYMOND W. MOORE.
LOREN F. STRINGER.

No references cited.